US012371560B2

(12) United States Patent
Cao et al.

(10) Patent No.: US 12,371,560 B2
(45) Date of Patent: Jul. 29, 2025

(54) REGENERATED ALLOY MATERIAL BASED ON CHEMICAL AND PHYSICAL CO-MODIFICATION AND METHOD FOR PREPARING SAME

(71) Applicant: CHINA NATIONAL ELECTRIC APPARATUS RESEARCH INSTITUTE CO., LTD., Guangdong (CN)

(72) Inventors: Nuo Cao, Guangdong (CN); Yonggao Fu, Guangdong (CN); Jiaqi Hu, Guangdong (CN); Ling Wang, Guangdong (CN); Chao Wan, Guangdong (CN)

(73) Assignee: CHINA NATIONAL ELECTRIC APPARATUS RESEARCH INSTITUTE CO., LTD., Guangdong (CN)

( * ) Notice: Subject to any disclaimer, the term of this patent is extended or adjusted under 35 U.S.C. 154(b) by 644 days.

(21) Appl. No.: 17/794,622

(22) PCT Filed: Jul. 28, 2021

(86) PCT No.: PCT/CN2021/108824
§ 371 (c)(1),
(2) Date: Jul. 22, 2022

(87) PCT Pub. No.: WO2022/121329
PCT Pub. Date: Jun. 16, 2022

(65) Prior Publication Data
US 2023/0078328 A1 Mar. 16, 2023

(30) Foreign Application Priority Data
Dec. 8, 2020 (CN) .......................... 202011424138.6

(51) Int. Cl.
*C08L 51/04* (2006.01)
*C08J 3/00* (2006.01)
*C08J 3/24* (2006.01)
*C08K 5/353* (2006.01)

(52) U.S. Cl.
CPC .............. *C08L 51/04* (2013.01); *C08J 3/005* (2013.01); *C08J 3/242* (2013.01); *C08K 5/353* (2013.01); *C08J 2325/06* (2013.01); *C08J 2451/08* (2013.01); *C08J 2453/00* (2013.01); *C08J 2471/12* (2013.01); *C08L 2205/035* (2013.01); *C08L 2207/20* (2013.01); *C08L 2312/00* (2013.01)

(58) Field of Classification Search
CPC ....... C08L 51/04; C08L 71/12; C08L 2207/20
See application file for complete search history.

(56) References Cited

U.S. PATENT DOCUMENTS 4,113,797 A * 9/1978 Lee, Jr. ............... C08L 51/04
525/71
4,404,321 A * 9/1983 Abolins ............... C08L 71/123
525/905

FOREIGN PATENT DOCUMENTS

| CN | 103205106 | 7/2013 |
| CN | 107936455 | 4/2018 |
| CN | 109401273 | 3/2019 |
| CN | 111187446 | 5/2020 |
| CN | 112724571 | 4/2021 |
| DE | 19538207 | 4/1997 |
| JP | H05269907 | 10/1993 |
| JP | 2002212414 | 7/2002 |

OTHER PUBLICATIONS

Machine Translation of CN111187446A. May 22, 2020. (Year: 2020).*
Machine Translation of CN103205106A. Jul. 17, 2013. (Year: 2013).*
Wang, Pan et al., "Chain Extension Modification of Recycled High Impact Polystyrene with Oxazoline," Polymer Materials Science & Engineering, May 2015, submit with English abstract, pp. 1-7.
Zhang, Yanzhang et al., "Study on Recovery of DMAP Catalyst for Ester Synthesis," Fine and Specialty Chemical, Jun. 2019, submit with English abstract, Jun. 2019, pp. 1-4.
Chen, Kai et al., "Study on PPO/HIPS/Elastomer Alloy," Engineering Plastics Application, 1998, submit with English abstract, pp. 1-4.
S.C. Tjong, "Fracture Toughening Behavior and Mechanical Properties of Polyphenylene Oxide/High-Impact Polystyrene Blends," Polymer Engineering & Science, Nov. 1996, pp. 2626-2633.
"International Search Report (Form PCT/ISA/210) of PCT//CN2021/108824," mailed on Nov. 3, 2021, with English translation thereof, pp. 1-6.

* cited by examiner

*Primary Examiner* — Stephen E Rieth
(74) *Attorney, Agent, or Firm* — JCIP GLOBAL INC.

(57) ABSTRACT

The present invention discloses a regenerated HIPS/PPO alloy material based on chemical and physical co-modification, which is mainly composed of the following components in parts by mass: waste HIPS 60-70, PPO 30-40, HIPS-based macromolecular chain extender 2-8, elastomer toughening agent 2-10, oxazoline chain extender 0.2-1, and chain-extension catalyst 0.1-0.4. The alloy material uses chemical modification of in-situ chain extension and compatibilization of the macromolecular chain extender to restore a molecular chain structure, improve a phase interface and increase compatibility of the alloy. Through physical modification introduced by adding the elastomer toughening agent, a combined effect of chemical modification and physical modification is exploited, with target properties improved, a regenerated plastic alloy material with an excellent comprehensive property prepared, and the waste fully utilized to achieve energy saving and emission reduction. A method for preparing the above-described alloy material is also disclosed.

14 Claims, No Drawings

REGENERATED ALLOY MATERIAL BASED ON CHEMICAL AND PHYSICAL CO-MODIFICATION AND METHOD FOR PREPARING SAME

CROSS-REFERENCE TO RELATED APPLICATION

This application is a 371 of international application of PCT application serial no. PCT/CN2021/108824, filed on Jul. 28, 2021, which claims the priority benefit of China application no. 202011424138.6, filed on Dec. 8, 2020. The entirety of each of the above mentioned patent applications is hereby incorporated by reference herein and made a part of this specification.

TECHNICAL FIELD

The present invention belongs to the technical field of waste HIPS regeneration, and specifically relates to a regenerated alloy material based on chemical and physical co-modification and a method for preparing same.

DESCRIPTION OF RELATED ART

High impact polystyrene (HIPS) is widely used in the preparation of plastic housings for electronic devices such as air-conditioning cabinets and television sets due to its excellent comprehensive property. The main advantages of HIPS include high impact strength, good gloss, good heat resistance and flowability, etc. However, the degradation of HIPS may occur during processing and use, leading to chain scission of molecular chain and change of phase structure, resulting in that the property of waste HIPS is far worse than that of new HIPS.

Polyphenylene oxide (PPO) has the advantages of high rigidity, high heat resistance, flame resistance, high strength and excellent electrical properties, but its fluidity is poor and viscosity is sensitive to temperature, so that the molding temperature should be strictly controlled. PPO is suitable for manufacturing heat-resistant parts, insulation parts, wear-reducing and resistant parts, transmission parts, medical and electronic parts, etc. and is widely used in automotive industry, electronic and electrical devices, office equipment, precision equipment, textile equipment, etc.

The alloying of polymer materials can combine the superior properties of matrix materials to achieve high value applications, so that it is also an important research and application direction. It has cost advantage to prepare high molecular alloy from waste materials, but it is necessary to repair the properties of waste materials effectively to prepare regenerated alloy materials with market demand. Blending new materials of HIPS with PPO not only improves the strength of HIPS, but also improves the fluidity of PPO due to the good compatibility between the two. However, the compatibility of HIPS/PPO blends is negatively affected by the aging and degradation of HIPS and the change of molecular structure and polarity during use.

In combination with the above-mentioned status quo, if the waste HIPS and PPO can be used to prepare a polymer alloy, the active groups such as hydroxyl group and carboxyl group generated after the waste HIPS aging can be fully used. The waste HIPS can be initially repaired through molecular chain extension and similar compatibility. The comprehensive property of the waste HIPS base material can be comprehensively improved, and the compatibility of the waste HIPS and PPO can be effectively improved at the same time. A regenerated alloy material with excellent comprehensive property can be obtained through the physical modification of a combination toughening agent with the joint action of chemical modification and physical modification fully used. Due to the large use of waste materials, this material has the advantages of cost-effective and environmental properties, and has broad application prospects.

SUMMARY

The object of the present invention is to provide a regenerated alloy material based on chemical and physical co-modification, wherein the regenerated HIPS/PPO alloy material uses the chemical modification of in-situ chain extension and compatibilization of a macromolecular chain extender to repair a molecular chain structure, improve a phase interface and increase a compatibility. On the basis of the initial improvement of the micro-properties and macro-mechanical properties of waste materials, with the physical modification effect introduced by combining and adding an elastomer toughening agent, the combined effect of chemical modification and physical modification is fully exploited, and the target properties are further improved. Finally, a regenerated plastic alloy material with an excellent comprehensive property is prepared, and the waste is fully utilized to achieve energy saving and emission reduction.

It is also an object of the present invention to provide a method for preparing the regenerated alloy material based on chemical and physical co-modification as described above.

The above-mentioned first technical problem of the present invention is achieved by the following technical solution: a regenerated alloy material based on chemical and physical co-modification, mainly composed of the following components in parts by mass:

a waste HIPS: 60-70;
a PPO: 30-40;
a HIPS-based macromolecular chain extender: 2-8;
an elastomer toughening agent: 2-10;
an oxazoline chain extender: 0.2-1; and
a chain-extension catalyst: 0.1-0.4.

Among the above-described components of the regenerated alloy material based on chemical and physical co-modification:

The HIPS-based macromolecular chain extender is preferably a high impact polystyrene grafted a maleic anhydride (HIPS-g-MAH).

The elastomer toughening agent is preferably a styrene-ethylene-butylene-styrene block copolymer (SEBS).

The oxazoline chain extender is preferably a 2,2'-(1,3-phenylene)-bisoxazoline (PBO).

The chain-extension catalyst is preferably a 4-dimethylamino pyridine (DMAP).

The waste HIPS is preferably a flake material obtained after crushing and homogenizing the waste HIPS.

The PPO is a polyphenylene ether.

The above-mentioned second object of the present invention is achieved by the following technical solution: a method for preparing the regenerated alloy material based on chemical and physical co-modification, comprising the steps of: mixing the waste HIPS, the PPO, the HIPS-based macromolecular chain extender and the chain-extension catalyst according to the above-mentioned dosage relationship to obtain a mixture material, adding the mixture material from a main feeding device of a twin-screw extruder to melt, controlling a screw rotation speed to 60-90 rpm, adding the oxazoline chain extender and the elastomer toughening agent from a fourth processing zone of the twin-screw extruder according to the above-mentioned dosage relationship to blend with a melted mixture material, and then extruding, drawing, cooling and pelletizing to obtain the regenerated HIPS/PPO alloy material.

In the method for preparing the regenerated alloy material based on chemical and physical co-modification:

A processing temperature range of the twin screw extruder is preferably at 225-255° C.

Further, temperatures of six processing zones of the twin-screw extruder are preferably successively 225° C., 230° C., 230° C., 235° C., 255° C., and 255° C.

The HIPS-based macromolecular chain extender added in the present invention can simultaneously play three key roles.

(1) The reactive anhydride groups on the molecular chain and the hydroxyl groups generated on the aged chain of waste HIPS can occur an in-situ chain-extension reaction under extrusion conditions to achieve chain extension of waste HIPS, thereby repairing the initial molecular structure of waste and greatly improving the macro property of HIPS substrate.

(2) The structure of HIPS backbone of HIPS-based macromolecular chain extender is similar to that of waste HIPS structure, which is very helpful to improve the microstructure of waste HIPS after aging and decrease an interfacial force, and then promote the compatibility of HIPS phase and PPO phase.

(3) The HIPS-based macromolecular chain extender contains a certain amount of PB (polybutadiene) component, and the addition of the HIPS-based macromolecular chain extender is also equivalent to increasing an overall gel content of the regenerated alloy material, which exhibits a toughening function.

The chain-extension catalyst in the present invention is highly necessary. Since the processing temperature of PPO is higher and the stability of waste HIPS is lower than that of fresh HIPS, the waste HIPS component is likely to be degraded under the classical PPO processing conditions, i.e. long-term processing at a higher processing temperature, thereby affecting the overall properties of the regenerated alloy. Therefore, in order to avoid the degradation of waste materials and ensure the efficient progress of the chain-extension reaction, the chain-extension reaction is promoted by adding a chain-extension catalyst to reduce the extrusion time and lower the extrusion temperature.

The oxazoline chain extender added in the present invention is a carboxyl-reactive chain extender under extrusion processing conditions. In order to further enhance the chain extension modification effect, an anhydride-type HIPS-based macromolecular chain extender, which can react with hydroxyl groups in the aged molecular chain of the mixed system and complementarily generates new carboxyl groups to increase the chain extension potential of the subsequent use of the oxazoline chain extender, is firstly added from the main feeding device. Then the oxazoline chain extender is added into a feeding port in a middle of a barrel of the fourth zone to realize a stepwise reaction by feeding separately, such that an in-situ chain extension repair can be fully and effectively performed and the excessive consumption, which is caused by direct reaction between anhydride and oxazoline group when HIPS-based macromolecular chain extender and oxazoline chain extender are blended directly and thus affects the chain extension repair of backbone of the waste HIPS, can be avoided.

The elastomer toughening agent SEBS added in the present invention is a physical modifier of elastomer with ultra-high toughness and relatively low strength, which mainly neutralizes and improves the impact strength of the whole blend system through its own very high toughness. The elastomer toughening agent SEBS has good compatibility with HIPS and PPO and does not contain unsaturated carbon-carbon double bond which would easily lead to the decrease of aging resistance of regenerated products. As such, it is a better choice of the toughening agent for regenerated HIPS/PPO alloy. On the other hand, since the property that deteriorates the most seriously due to aging of waste HIPS is the impact strength (retention values of tensile strength and bending strength after aging are relatively high), while the other component PPO intrinsically has the characteristics of large rigidity, large strength and general toughness, toughening the regenerated HIPS/PPO alloy is very beneficial to improve its disadvantageous property, thus effectively broadening the application range.

It has been mentioned previously that temperature and screw rotation speed have a large effect on the comprehensive property of the regenerated alloy. Longer extrusion retention times and higher temperatures are beneficial to promote in-situ chain-extension reactions during extrusion and to make the blending more homogeneous, but overly long processing times and overly high temperatures may lead to decomposition of the regenerated material. Through a large number of experiments, it is proved that, based on the function of chain-extension catalyst, controlling the screw rotation speed to 60-90 rpm and processing temperature range of 225-255° C. can provide an effective blending and avoid the decomposition of regenerated materials without affecting the effect of in-situ chain extension.

Compared to the prior art, the present invention has the following advantages.

(1) The present invention uses a combination of two different chain extenders, based on in-situ chain extension and compatibilization, to originally and completely enhance the comprehensive property of waste HIPS and improve the compatibility of the blend.

(2) After the comprehensive property of HIPS-based material is improved originally and completely by in-situ chain extension, SEBS elastomer physical modifier is further introduced.

Through the co-action of chemical modification and physical modification, the toughness of regenerated HIPS/PPO alloy is further improved and its application range is effectively widened.

(3) The whole processing process of the present invention uses conventional plastic processing equipment to perform reaction-type extrusion by selecting the process and optimizing the formulation, and thus can be conveniently applied and popularized.

(4) The present invention provides a new solution for the high-value utilization of typical large-scale waste plastics, and also drives the development of regenerated plastics industry. Meanwhile, the related products have strong market competitiveness, and are in line with national energy saving and emission reduction policies, with good social and economic benefits.

DETAILED DESCRIPTION OF DISCLOSED EMBODIMENTS

Embodiment 1

The regenerated alloy material based on chemical and physical co-modification provided in this embodiment is mainly composed of the following components in parts by mass:

a waste HIPS: 70
a PPO: 30
a HIPS-based macromolecular chain extender: 8
an elastomer toughening agent: 10
an oxazoline chain extender: 0.8; and
a chain-extension catalyst: 0.4.

The HIPS-based macromolecular chain extender is a high impact polystyrene grafted maleic anhydride (HIPS-g-MAH). The elastomer toughening agent is a styrene-ethylene-butylene-styrene block copolymer (SEBS). The oxazoline chain extender is a 2,2'-(1,3-phenylene)-bisoxazoline (PBO). The chain extension catalyst is a 4-dimethylamino pyridine (DMAP). The waste HIPS is a flake material obtained after crushing and homogenizing the waste HIPS, and the PPO is a polyphenylene oxide.

The method for preparing the regenerated alloy material based on chemical and physical co-modification comprises the steps of: mixing the waste HIPS, the PPO, the HIPS-based macromolecular chain extender and the chain-extension catalyst according to the above-mentioned dosage relationship to obtain a mixture material, adding the mixture material from a main feeding device of a twin-screw extruder to melt, controlling a screw rotation speed to 60 rpm, adding the oxazoline chain extender and the elastomer toughening agent from a fourth processing zone of the twin-screw extruder according to the above-mentioned dosage relationship to blend with a melted mixture material, and then extruding, drawing, cooling and pelletizing to obtain the regenerated HIPS/PPO alloy material.

Temperatures of six processing zones of the twin-screw extruder are successively set to 225° C., 230° C., 230° C., 235° C., 255° C., and 255° C.

Embodiment 2

The regenerated alloy material based on chemical and physical co-modification provided in this embodiment is mainly composed of the following components in parts by mass:
a waste HIPS: 70
a PPO: 30
a HIPS-based macromolecular chain extender: 8
an elastomer toughening agent: 2
an oxazoline chain extender: 0.8; and
a chain-extension catalyst: 0.4.

The waste HIPS, the PPO, the HIPS-based macromolecular chain extender, the elastomer toughening agent, the oxazoline chain extender and the chain-extension catalyst are the same as those in Embodiment 1.

The method for preparing the regenerated alloy material based on chemical and physical co-modification comprises the steps of: mixing the waste HIPS, the PPO, the HIPS-based macromolecular chain extender and the chain-extension catalyst according to the above-mentioned dosage relationship to obtain a mixture material, adding the mixture material from a main feeding device of a twin-screw extruder to melt, controlling a screw rotation speed to 60 rpm, adding the oxazoline chain extender and the elastomer toughening agent from a fourth processing zone of the twin-screw extruder according to the above-mentioned dosage relationship to blend with a melted mixture material, and then extruding, drawing, cooling and pelletizing to obtain the regenerated HIPS/PPO alloy material.

Temperatures of six processing zones of the twin-screw extruder are successively set to 225° C., 230° C., 230° C., 235° C., 255° C., and 255° C.

Embodiment 3

The regenerated alloy material based on chemical and physical co-modification provided in this embodiment is mainly composed of the following components in parts by mass:
a waste HIPS: 60;
a PPO: 40;
a HIPS-based macromolecular chain extender: 4;
an elastomer toughening agent: 4;
an oxazoline chain extender: 0.4; and
a chain-extension catalyst: 0.2.

The waste HIPS, the PPO, the HIPS-based macromolecular chain extender, the elastomer toughening agent, the oxazoline chain extender and the chain-extension catalyst are the same as those in Embodiment 1.

The method for preparing the regenerated alloy material based on chemical and physical co-modification comprises the steps of: mixing the waste HIPS, the PPO, the HIPS-based macromolecular chain extender and the chain-extension catalyst according to the above-mentioned dosage relationship to obtain a mixture material, adding the mixture material from a main feeding device of a twin-screw extruder to melt, controlling a screw rotation speed to 90 rpm, adding the oxazoline chain extender and the elastomer toughening agent from a fourth processing zone of the twin-screw extruder according to the above-mentioned dosage relationship to blend with a melted mixture material, and then extruding, drawing, cooling and pelletizing to obtain the regenerated HIPS/PPO alloy material.

Temperatures of six processing zones of the twin-screw extruder are successively set to 225° C., 235° C., 235° C., 240° C., 255° C., and 250° C.

The mechanical properties of the alloy material based on chemical and physical co-modification prepared in Embodiments 1-3 are summarized in Table 1 below.

TABLE 1

Summary of Mechanical Properties of Regenerated HIPS/PPO Alloy Materials Prepared in Embodiments 1-3.

| | Bending strength (MPa) GB/T 9341 | Impact strength (KJ/m$^2$) GB/T 1043 | Tensile strength (MPa) GB/T 1040 |
|---|---|---|---|
| waste HIPS/PPO① | 62.5 | 3.6 | 46.2 |
| Embodiment 1 | 66.1 | 12.7 | 51.6 |
| Embodiment 2 | 70.1 | 9.5 | 53.9 |
| Comparative example 1② | 71.5 | 7.7 | 56.1 |
| Embodiment 3 | 68.5 | 10.5 | 54.9 |
| Comparative example 2③ | 70.3 | 7.5 | 58.4 |

In Table 1:

① The preparation method and steps are the same as those in embodiment 1. The material ratio is 70 parts of waste HIPS and 30 parts of PPO, and no HIPS-based macromolecular chain extender, elastomer toughening agent, oxazoline chain extender and chain-extension catalyst are contained.

② The preparation method and steps are the same as those in Embodiment 1 and Embodiment 2. The material ratio is 70 parts of waste HIPS, 30 parts of PPO, 8 parts of HIPS-based macromolecular chain extender, 0.8 part of oxazoline chain extender and 0.4 part of chain-extension catalyst, and no elastomer toughening agent is contained.

③ The preparation method and steps are the same as those in Embodiment 3. The material ratio is 60 parts of waste HIPS, 40 parts of PPO, 4 parts of HIPS-based macromolecular chain extender, 0.4 part of oxazoline chain extender and 0.2 part of chain-extension catalyst, and no elastomer toughening agent is contained.

It can be seen from the above-mentioned specific experimental data that, compared to the unmodified waste HIPS/PPO, the mechanical properties of the regenerated HIPS/PPO alloy prepared by the present invention are improved overall, and especially the improvement of the impact strength which is more sensitive to the molecular weight of the backbone, the structure of the molecular chain and the effect of the phase interface is particularly obvious.

Embodiment 1 differs from Embodiment 2 in that different amounts of the elastomer toughening agent are added, and it can be seen from Embodiments 1-2 that when the elastomer toughening agent is added in a relatively high amount, the impact strength of the alloy material can be greatly increased.

The difference between Embodiments 1-2 and Comparative example 1 is the addition of an elastomer toughening agent of ultra-high toughness and lower strength. In Embodiment 1, with chemical and physical co-modification, the impact strength is greatly increased by 65% and the bending and tensile strengths are only slightly decreased by about 8% (while the impact, bending and tensile strengths are increased by 253%, 6% and 12%, respectively, compared to the unmodified waste HIPS/PPO), and the comprehensive property is very good.

Embodiment 3 also had a similar comparative effect with Comparative example 2. Since the property that deteriorates the most seriously due to aging of waste HIPS is the impact strength (wherein retention values of tensile strength and bending strength after aging are relatively high), while the other component PPO intrinsically has the characteristics of large rigidity, large strength and general toughness, toughening the regenerated HIPS/PPO alloy has the disadvantageous property of impact strength.

Therefore, the present invention is based on chemical and physical co-modification, and is very beneficial to improve the environmental adaptability of regenerated products and widen the application scenarios thereof by very limitedly and slightly reducing the non-disadvantageous properties (strength properties) such as the tensile strength and the bending strength in exchange for great improvement in the disadvantageous property (toughness property) such as the impact strength. The regenerated alloy products with this comprehensive property have good market prospects.

The above-mentioned embodiments are preferred embodiments of the present invention, and the PPO, HIPS-based macromolecular chain extender HIPS-g-MAH, the elastomer toughening agent SEBS, the oxazoline chain extender PBO and the chain-extension catalyst DMAP selected in the embodiments are all obtained from commercially available products.

However, the implementations of the present invention are not limited to the above-mentioned embodiments, and the waste HIPS, the PPO and other raw materials selected in the above-mentioned embodiments may also be commercially available ready-made products with similar properties. Changes, modifications, substitutions, combinations, and simplifications which do not depart from the spiritual substances and principles of the present invention are all equivalent alternatives and are intended to be included in the scope of protection of the present invention.

What is claimed is:

1. A regenerated alloy material based on a chemical and physical co-modification, being obtained from the following components in parts by mass:
    a waste high impact polystyrene (HIPS): 60-70;
    a polyphenylene oxide (PPO): 30-40;
    a HIPS-based macromolecular chain extender: 2-8;
    an elastomer toughening agent: 2-10;
    an oxazoline chain extender: 0.2-1; and
    a chain-extension catalyst: 0.1-0.4.

2. The regenerated alloy material based on the chemical and physical co-modification according to claim 1, wherein the HIPS-based macromolecular chain extender is a high impact polystyrene grafted maleic anhydride (HIPS-g-MAH).

3. The regenerated alloy material based on the chemical and physical co-modification according to claim 1, wherein the elastomer toughening agent is a styrene-ethylene-butylene-styrene block copolymer (SEBS).

4. The regenerated alloy material based on the chemical and physical co-modification according to claim 1, wherein the oxazoline chain extender is a 2,2'-(1,3-phenylene)-bisoxazoline (PBO).

5. The regenerated alloy material based on the chemical and physical co-modification according to claim 1, wherein the chain-extension catalyst is a 4-dimethylamino pyridine (DMAP).

6. The regenerated alloy material based on the chemical and physical co-modification according to claim 1, wherein the waste HIPS is a flake material obtained after crushing and homogenizing a waste HIPS material.

7. A method for preparing the regenerated alloy material based on a chemical and physical co-modification according to claim 1, comprising:
    mixing the waste HIPS, the PPO, the HIPS-based macromolecular chain extender and the chain-extension catalyst to obtain a mixture material;
    adding the mixture material from a main feeding device of a twin-screw extruder to melt, and controlling a screw rotation speed to 60-90 rpm;
    adding the oxazoline chain extender and the elastomer toughening agent from a processing zone of the twin-screw extruder to blend with a melted mixture material; and
    extruding, drawing, cooling and pelletizing to obtain the regenerated alloy material.

8. The method for preparing the regenerated alloy material based on the chemical and physical co-modification according to claim 7, wherein a processing temperature range of the twin screw extruder is at 225-255° C.

9. The method for preparing the regenerated alloy material based on the chemical and physical co-modification according to claim 8, wherein temperatures of six processing zones of the twin-screw extruder are successively 225° C., 230° C., 230° C., 235° C., 255° C., and 255° C.

10. A method for preparing the regenerated alloy material based on a chemical and physical co-modification according to claim 2, comprising:
    mixing the waste HIPS, the PPO, the HIPS-based macromolecular chain extender and the chain-extension catalyst to obtain a mixture material;
    adding the mixture material from a main feeding device of a twin-screw extruder to melt, and controlling a screw rotation speed to 60-90 rpm;

adding the oxazoline chain extender and the elastomer toughening agent from a processing zone of the twin-screw extruder to blend with a melted mixture material; and extruding, drawing, cooling and pelletizing to obtain the regenerated alloy material.

11. A method for preparing the regenerated alloy material based on a chemical and physical co-modification according to claim 3, comprising:

mixing the waste HIPS, the PPO, the HIPS-based macromolecular chain extender and the chain-extension catalyst to obtain a mixture material;

adding the mixture material from a main feeding device of a twin-screw extruder to melt, and controlling a screw rotation speed to 60-90 rpm;

adding the oxazoline chain extender and the elastomer toughening agent from a processing zone of the twin-screw extruder to blend with a melted mixture material; and extruding, drawing, cooling and pelletizing to obtain the regenerated alloy material.

12. A method for preparing the regenerated alloy material based on a chemical and physical co-modification according to claim 4, comprising:

mixing the waste HIPS, the PPO, the HIPS-based macromolecular chain extender and the chain-extension catalyst to obtain a mixture material;

adding the mixture material from a main feeding device of a twin-screw extruder to melt, and controlling a screw rotation speed to 60-90 rpm;

adding the oxazoline chain extender and the elastomer toughening agent from a processing zone of the twin-screw extruder to blend with a melted mixture material; and extruding, drawing, cooling and pelletizing to obtain the regenerated alloy material.

13. A method for preparing the regenerated alloy material based on a chemical and physical co-modification according to claim 5, comprising:

mixing the waste HIPS, the PPO, the HIPS-based macromolecular chain extender and the chain-extension catalyst to obtain a mixture material;

adding the mixture material from a main feeding device of a twin-screw extruder to melt, and controlling a screw rotation speed to 60-90 rpm;

adding the oxazoline chain extender and the elastomer toughening agent from a processing zone of the twin-screw extruder to blend with a melted mixture material; and extruding, drawing, cooling and pelletizing to obtain the regenerated alloy material.

14. A method for preparing the regenerated alloy material based on a chemical and physical co-modification according to claim 6, comprising:

mixing the waste HIPS, the PPO, the HIPS-based macromolecular chain extender and the chain-extension catalyst to obtain a mixture material;

adding the mixture material from a main feeding device of a twin-screw extruder to melt, and controlling a screw rotation speed to 60-90 rpm;

adding the oxazoline chain extender and the elastomer toughening agent from a processing zone of the twin-screw extruder to blend with a melted mixture material; and extruding, drawing, cooling and pelletizing to obtain the regenerated alloy material.

\* \* \* \* \*